United States Patent
Grygiel et al.

(10) Patent No.: US 12,072,544 B2
(45) Date of Patent: Aug. 27, 2024

(54) WAVELENGTH DIVISION MULTIPLEXING CASSETTE FOR A FIBER OPTIC NETWORK AND METHOD OF MAKING SAME

(71) Applicant: CORNING RESEARCH & DEVELOPMENT CORPORATION, Corning, NY (US)

(72) Inventors: Tim Grygiel, Berlin (DE); Andreas Matiss, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 86 days.

(21) Appl. No.: 17/830,406

(22) Filed: Jun. 2, 2022

(65) Prior Publication Data
US 2022/0397736 A1 Dec. 15, 2022

Related U.S. Application Data

(60) Provisional application No. 63/208,686, filed on Jun. 9, 2021.

(51) Int. Cl.
| | |
|---|---|
| *G02B 6/255* | (2006.01) |
| *G02B 6/293* | (2006.01) |
| *G02B 6/44* | (2006.01) |

(52) U.S. Cl.
CPC ......... *G02B 6/4445* (2013.01); *G02B 6/2558* (2013.01); *G02B 6/29364* (2013.01); *G02B 6/444* (2013.01); *G02B 6/4454* (2013.01)

(58) Field of Classification Search
CPC .. G02B 6/2558; G02B 6/29364; G02B 6/444; G02B 6/4445; G02B 6/4454
See application file for complete search history.

(56) References Cited

U.S. PATENT DOCUMENTS

| | | | |
|---|---|---|---|
| 6,125,221 A | 9/2000 | Bergmann et al. | |
| 6,504,989 B1 * | 1/2003 | Gooding | G02B 6/4454 385/135 |

(Continued)

FOREIGN PATENT DOCUMENTS

DE   102016007178 A1   12/2017

OTHER PUBLICATIONS

European Patent Application No. 22178127.1, Extended European Search Report, dated Nov. 24, 2022; 8 pages; European Patent Office.

*Primary Examiner* — Ryan A Lepisto
(74) *Attorney, Agent, or Firm* — Tamika A. Crawl-Bey

(57) ABSTRACT

A method of assembling a wavelength division multiplexing (WDM) cassette for a fiber optic network is disclosed and includes attaching a first plurality of wavelength filters to a first cassette workpiece, attaching a second plurality of wavelength filters to a second cassette workpiece, organizing the optical fibers extending from the wavelength filters, adjusting a length of the optical fibers extending from wavelength filters, and forming an optical connection between the optical fibers from the wavelength filters via a mass fusion splice. The first cassette workpiece and the second cassette workpiece are separate from each during at least one of the attaching, organizing, adjusting, and forming steps. The optical fibers may have predetermined lengths for being arranged in a helix configuration and folded to produce an organized fiber stack that fits within the confines of the cassette. A WDM cassette having an organized arrangement of optical fibers is also disclosed.

10 Claims, 15 Drawing Sheets

(56) References Cited

U.S. PATENT DOCUMENTS

| | | |
|---|---|---|
| 6,788,869 B2 | 9/2004 | Strausbaugh et al. |
| 7,113,686 B2 * | 9/2006 | Bellekens ............ G02B 6/4454 |
| | | 385/134 |
| 8,559,784 B2 | 10/2013 | Ray et al. |
| 9,207,422 B2 * | 12/2015 | Ray ...................... G02B 6/4454 |
| 10,302,886 B2 * | 5/2019 | Kubinski ............. G02B 6/4454 |
| 10,715,271 B1 | 7/2020 | Cox et al. |
| 11,249,269 B2 * | 2/2022 | Sievers ................ G02B 6/4455 |
| 11,747,579 B2 * | 9/2023 | Green ................... G02B 6/4454 |
| | | 385/14 |
| 2002/0159747 A1 | 10/2002 | Strausbaugh et al. |
| 2005/0018948 A1 * | 1/2005 | Bellekens ............ G02B 6/4471 |
| | | 385/14 |
| 2013/0105420 A1 | 5/2013 | Ray et al. |
| 2013/0108225 A1 | 5/2013 | Ray et al. |
| 2016/0238811 A1 | 8/2016 | Simmons et al. |
| 2019/0086626 A1 | 3/2019 | Kubinski |

\* cited by examiner

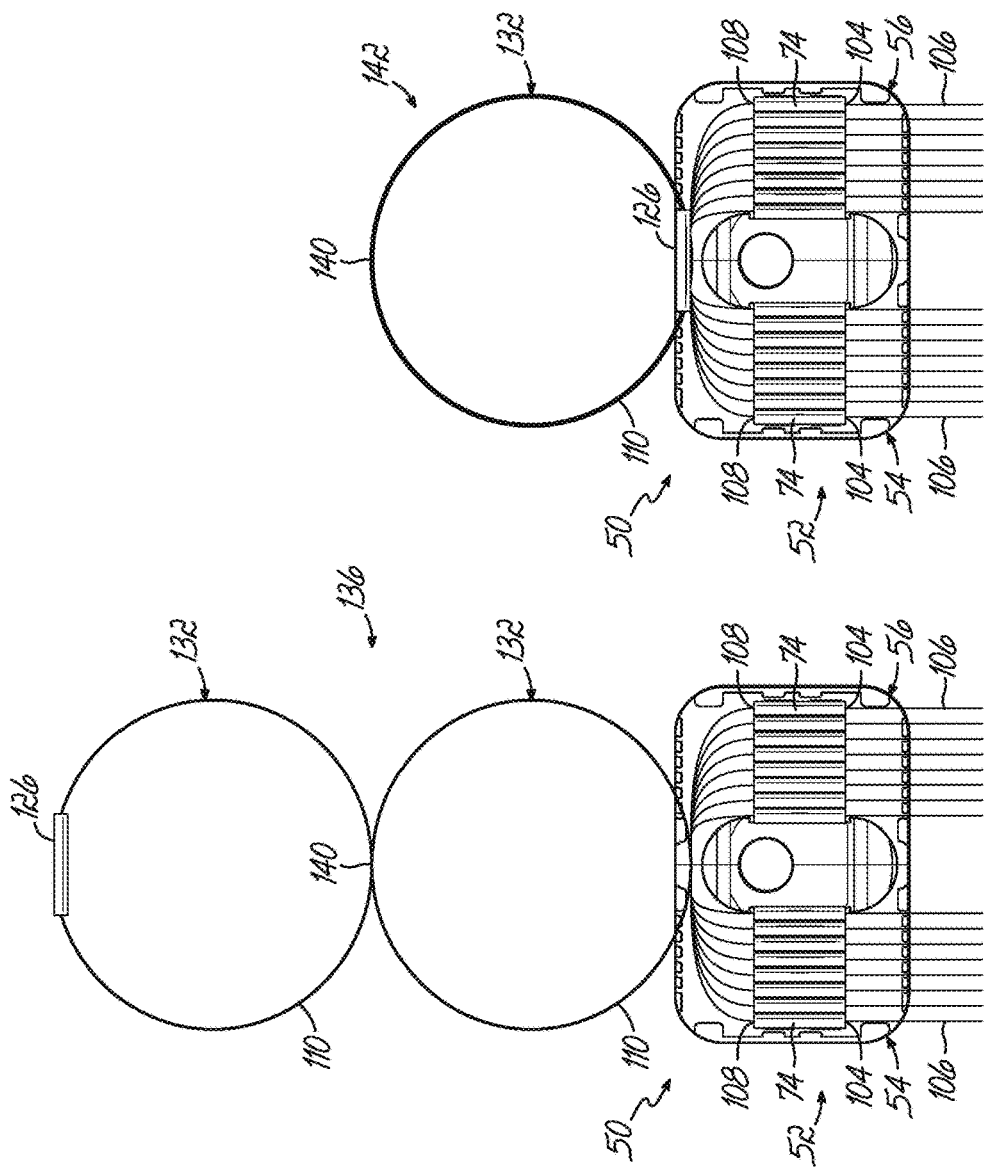

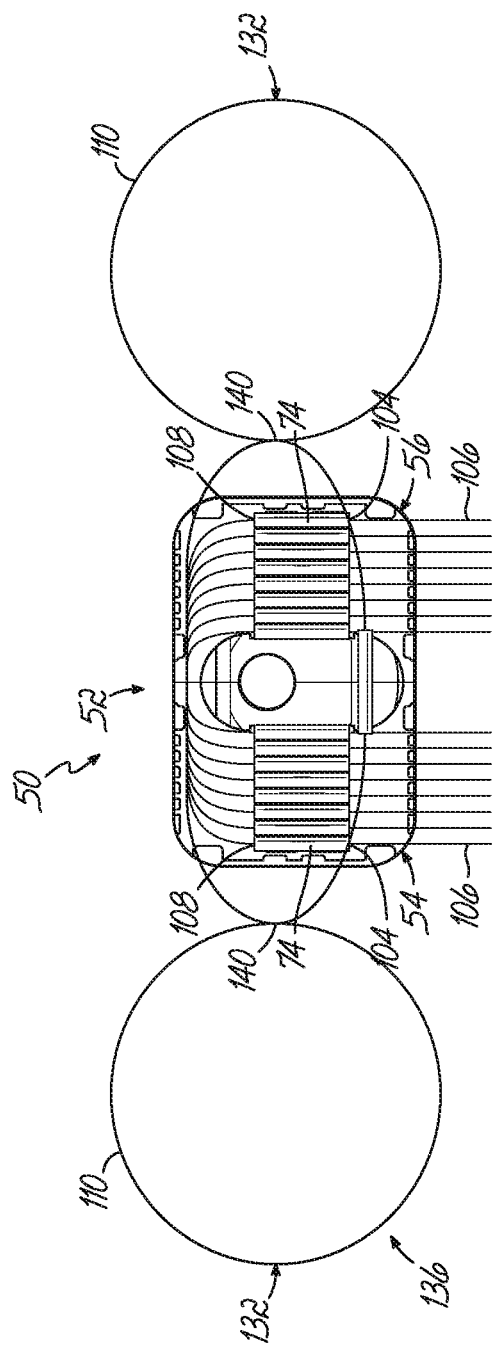
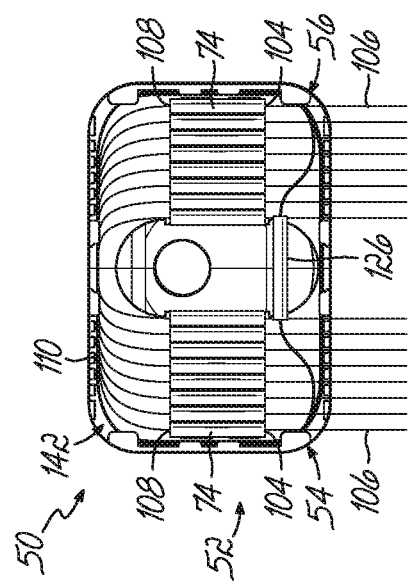
FIG. 11B
FIG. 11C

WAVELENGTH DIVISION MULTIPLEXING CASSETTE FOR A FIBER OPTIC NETWORK AND METHOD OF MAKING SAME

CROSS-REFERENCE

This application claims the benefit of priority of U.S. Provisional Application No. 63/208,686, filed on Jun. 9, 2021, the content of which is relied upon and incorporated herein by reference in its entirety.

TECHNICAL FIELD

This disclosure relates generally to optical connectivity, and more particularly to a compact fiber optic wavelength division multiplexing and/or demultiplexing cassette with improved management of the optical fibers in the cassette and a method of making such a cassette having improved optical fiber management.

BACKGROUND

Optical fibers are useful in a wide variety of applications, including the telecommunications industry for voice, video, and data transmissions. The benefits of optical fiber are well known and include higher signal-to-noise ratios and increased bandwidth compared to conventional copper-based transmission technologies. To meet modern demands for increased bandwidth and improved performance, telecommunication networks are increasingly providing optical fiber connectivity closer to end subscribers. These initiatives include fiber-to-the-node (FTTN), fiber-to-the-premises (FTTP), fiber-to-the-home (FTTH), and the like (generally described as FTTx).

In an FTTx network, fiber optic cables are used to carry optical signals to various distribution points and, in some cases, all the way to end subscribers. For example, FIG. 1 is a schematic diagram of an exemplary FTTx network 10 that distributes optical signals generated at a switching point 12 (e.g., a central office of a network provider) to subscriber premises 14. Optical line terminals (OLTs; not shown) at the switching point 12 convert electrical signals to optical signals. Fiber optic feeder cables 16 then carry the optical signals to various local convergence points 18, which act as locations for splicing and making cross-connections and interconnections. The local convergence points 18 often include splitters to enable any given optical fiber in the fiber optic feeder cable 16 to serve multiple subscriber premises 14. As a result, the optical signals are "branched out" from the optical fibers of the fiber optic feeder cables 16 to optical fibers of distribution cables 20 that exit the local convergence points 18.

At network access points closer to the subscriber premises 14, some or all of the optical fibers in the distribution cables 20 may be accessed to connect to one or more subscriber premises 14. Drop cables 22 extend from the network access points to the subscriber premises 14, which may be single-dwelling units (SDU), multi-dwelling units (MDU), businesses, and/or other facilities or buildings. A conversion of optical signals back to electrical signals may occur at the network access points or at the subscriber premises 14.

There are many different network architectures, and the various tasks required to distribute optical signals (e.g., splitting, splicing, routing, connecting subscribers) can occur at several locations. Regardless of whether a location is considered a local convergence point, network access point, subscriber premise, or something else, fiber optic equipment is used to house components that carry out one or more of the tasks. The term "terminal" will be used in this disclosure to generically refer to such equipment, which may include fiber distribution hubs (FDH), cabinets, closures, network interface devices, distributor frames, etc.

Wavelength division multiplexing (WDM) is known for increasing the amount of data transmitted through an optical fiber by using different wavelengths of laser light. For example, the fiber optic network may include a multiplexer on the transmission side of the optical signal to combine several signals together and transmit that signal through an optical fiber of the fiber optic network. The fiber optic network may further include a demultiplexer on the receiver side of the optical signal to split the signal back out to its individual signals. To this end, various terminals of the fiber optic network 10, such as at the switching point 12 or the local convergence point 18, may include one or more WDM cassettes for multiplexing and/or demultiplexing signals carried through the fiber optic network 10.

FIG. 2 is a schematic diagram of a WDM cassette 30 in accordance with the prior art. The cassette 30 includes a cassette body 32 having a plurality of wavelength filter devices 34 (also referred to as "wavelength filters 34" or "filters 34" in this disclosure) arranged in the cassette body 32. In the illustrated case, the WDM cassette 30 is an 8-channel cassette (with 8 corresponding wavelength filters 34), but the number may vary. Each of the filters 34 may be three-port wavelength division multiplexing (WDM) devices having a first side or end with a transmission port 36 from which an optical fiber 38 extends and a second side or end with an input/output (I/O) port 40a and a reflection port 40b from which respective optical fibers 42a, 42b extend. The cassette 30 also includes a combination optical fiber 44 ("com fiber") that carries a combined signal either as an input or an output to or from the cassette 30. The com fiber 44 is connected to an I/O port 40a, via the appropriate optical fiber 42a, associated with one of the wavelength filters 34 (e.g., the first wavelength filter 34), as illustrated in FIG. 2. The optical fibers 42a, 42b from the I/O ports 40a and reflective ports 40b are concatenated in a zig-zag pattern between the plurality of wavelength filters 34, as is generally known in the art. The structure and function of such devices are well-known to those in the optical communications field and, as a result, need not be described in this disclosure. Thus, even though multiple components (e.g., collimators, lenses, thin-film filter, etc.) may be included as part of the wavelength filters 34, such components are not illustrated to simplify the drawings.

In operation, the WDM cassette 30 may be bidirectional and operate in a multiplexing mode or a demultiplexing mode. In a multiplexing mode, optical signals of different wavelength are transmitted as input to the transmission ports 36 of the filters 34 via optical fibers 38 to produce a combined signal output through the com fiber 44 and through the fiber optic network 10. In a demultiplexing mode, a combined signal is input through the com fiber 44 and separated out to optical signals of different wavelength and output through the transmission ports 36 of the wavelength filters 34 via optical fibers 38. Although not shown, the cassette 30 may include multiple com fibers 44 and have the capability of operating in both multiplexing mode and demultiplexing mode via the different com fibers 44, as is generally known in the optical communications industry.

While the WDM cassette 30, as schematically illustrated in FIG. 2, generally operates for its intended purpose, such cassettes have drawbacks for which manufacturers continually strive to improve upon. By way of example, the construction of a WDM cassette can be a labor-intensive and time-consuming task. More particularly, the construction of a WDM cassette is typically done component-by-component and employing single splice connections 46 for the optical fibers 42a, 42b, 44 on the concatenated side of the wavelength filters 34. Since each component and optical fiber is handled individually, there is a high risk of damaging the optical fibers 42a, 42b, 44, mixing up the order of the I/O ports 40a and reflective ports 40b in the concatenation sequence (especially for high channel cassettes), forming defective splices 46 between optical fibers 42a, 42b, 44, etc. that result in a low first pass yield for WDM cassettes 30. The defective WDM cassettes 30 then have to be analyzed (e.g., troubleshooting) to locate and resolve the defects, which further increases time and costs.

Additionally, to allow future rework of the WDM cassette 30, depending on various potential applications and configurations, the optical fibers 42a, 42b, 44 are provided with excess fiber lengths that are stored in the WDM cassette 30. The amount of additional fiber length for each of the optical fibers 42a, 42b, 44 is typically unspecified and provided in an ad hoc manner, with technicians tending to provide too much fiber length to ensure rework capability of the cassette in the future. Additionally, the WDM cassette 30 generally includes no or limited fiber routing fixtures for handling the excess fiber length within the cassette 30. The result can be a highly unorganized fiber stack piled on top of the cassette components that makes any rework of the WDM cassette 30 using the excess fiber length difficult and time consuming. This frustrates the very purpose of providing the excess fiber length in the WDM cassette 30.

SUMMARY

A method of assembling a wavelength division multiplexing (WDM) cassette for a fiber optic network is disclosed. The method includes attaching a first plurality of wavelength filters to a first cassette workpiece and attaching a second plurality of wavelength filters to a second cassette workpiece. Each of the first plurality of the wavelength filters and each of the second plurality of wavelength filters have a first end from which an optical fiber extends and a second end from which one or more optical fibers extend. The method further includes organizing the optical fibers extending from the second ends of the first and second plurality of wavelength filters, adjusting a length of the optical fibers extending from the second ends of the first plurality of wavelength filters, adjusting a length of the optical fibers extending from the second ends of the second plurality of wavelength filters, and forming an optical connection between the optical fibers extending from the second ends of the first plurality of wavelength filters and the optical fibers extending from the second ends of the second plurality of wavelength filters. The first cassette workpiece and the second cassette workpiece may be separate from each other during at least one of the attaching, organizing, adjusting, and forming steps. In an exemplary embodiment, the first cassette workpiece and the second cassette workpiece may be separate from each other during each of the attaching, organizing, adjusting, and forming steps.

In an exemplary embodiment, attaching the first plurality of wavelength filters to the first cassette workpiece further includes arranging the first plurality of wavelength filters side-by-side on the first cassette workpiece with the respective first ends facing a first side of the first cassette workpiece and the respective second ends facing a second side of the first cassette workpiece. Moreover, attaching the second plurality of wavelength filters to the second cassette workpiece further includes arranging the second plurality of wavelength filters side-by-side on the second cassette workpiece with the respective first ends facing a first side of the second cassette workpiece and the respective second ends facing a second side of the second cassette workpiece. The first and second cassette workpieces may include a plurality of dividing walls or ridges to facilitate the arrangement of the plurality of wavelength filters in the desired arrangement.

In an exemplary embodiment, organizing the optical fibers extending from the second ends of the first plurality of wavelength filters may further include ribbonizing a portion of the optical fibers extending from the second ends of the first plurality of wavelength filters. Moreover, organizing the optical fibers extending from the second ends of the second plurality of wavelength filters may further include ribbonizing a portion of the optical fibers extending from the second ends of the second plurality of wavelength filters. Ribbonizing the optical fibers not only facilitates organization of the plurality of optical fibers, but also facilitates handling of the optical fibers during the assembly process.

In an exemplary embodiment, forming the optical connection between the optical fibers extending from the second ends of the first plurality of wavelength filters and the optical fibers extending from the second ends of the second plurality of wavelength filters may further include forming the optical connection using a mass fusion splice, such as a mass fusion ribbon splice. By using a mass fusion splice, the costly and time-consuming work of many single splice processes may be avoided. Additionally, the quality and robustness of mass fusion splices reduces defects and increases first pass manufacturing yields.

In one embodiment, the first cassette workpiece defines a first cassette body portion and the second cassette workpiece defines a second cassette body portion. For example, the first cassette body portion may define one half of the cassette body and the second cassette body portion may define the other half of the cassette body. In this embodiment, the method may further include connecting the first cassette body portion and the second cassette body portion together to form the cassette body. In an alternative embodiment, however, the first cassette workpiece may define a first mounting plate and the second cassette workpiece may define a second mounting plate. In this embodiment, the method may further include attaching the first mounting plate to the cassette body and attaching the second mounting plate to the cassette body. Unlike the embodiment described above, the cassette body in this alternative embodiment may be a fully assembled, unitary body.

In a further aspect of the disclosure, the optical fibers extending from the second ends of the first plurality of wavelength fibers and the optical fibers extending from the second ends of the second plurality of wavelength filters substantially form a loop. As part of a fiber management scheme, the method may further include forming a helix configuration from the loop, wherein the helix configuration includes a plurality of cassette loops wherein each of the plurality of cassette loops is configured to fit within the confines of the cassette body. By way of example, in one embodiment, forming the helix configuration may further include twisting the loop one or more times to form the plurality of cassette loops and one or more intersecting points each between a respective pair of adjacent cassette loops. Furthermore, the method may include folding the helix configuration about the one or more intersecting points to form a fiber stack that includes the plurality of cassette loops overlapping with each other, such as in a vertically stacked arrangement.

In one aspect of the disclosure, a length D of the loop correlates to a physical dimension of the cassette body. For example, the length D of the loop may correlate to a length or width of the cassette body. Still further, the length D of the loop may correlate to an inner perimeter of the cassette body.

In yet a further embodiment, a wavelength division multiplexing (WDM) cassette is disclosed. The WDM cassette includes a cassette body having a first cassette workpiece and a second cassette workpiece. A first plurality of wavelength filters is attached to the first cassette workpiece, wherein each of the first plurality of the wavelength filters have a first end facing a first side of the cassette body and a second end facing a second side of the cassette body. A second plurality of wavelength filters is attached to the second cassette workpiece, wherein each of the second plurality of the wavelength filters have a first end facing a first side of the cassette body and a second end facing a second side of the cassette body. A plurality of first optical fibers each extends from the second end of a respective wavelength filter in the first plurality of wavelength filters and a plurality of second optical fibers each extends from the second end of a respective wavelength filter in the second plurality of wavelength filters. A mass fusion splice connects ends of the plurality of first optical fibers and ends of the plurality of second optical fibers such that a main fiber loop is formed between the first plurality of wavelength filters and the second plurality of wavelength filters. The main fiber loop is stored within the cassette body in a twisted and folded configuration that defines a plurality of cassette loops, wherein each of the plurality of cassette loops is sized to fit within the confines of the cassette body.

In an exemplary embodiment, the first plurality of wavelength filters may be arranged side-by-side on the first cassette workpiece. More particularly, the first cassette workpiece may include a plurality of dividing walls or ridges that define a plurality of generally parallel slots, wherein each slot is configured to receive a respective one of the first plurality of wavelength filters. Similarly, the second plurality of wavelength filters may be arranged side-by-side on the second cassette workpiece, and the second cassette workpiece may include a plurality of dividing walls or ridges that define a plurality of generally parallel slots, wherein each slot is configured to receive a respective one of the second plurality of wavelength filters.

In one embodiment, the cassette body may further include a plurality of tabs for securing the plurality of cassette loops to the cassette body. Additionally, in one embodiment, the mass fusion splice may include a splice protector and the cassette body may include a channel that receives the splice protector. In an exemplary embodiment, the second side of the cassette body may include a plurality of first slots configured to receive the plurality of first optical fibers during assembly of the cassette and a plurality of second slots configured to receive the plurality of second optical fibers during assembly of the cassette.

In one embodiment, the first cassette workpiece may be defined by a first cassette body portion and the second cassette workpiece may be defined by a second cassette body portion, wherein the first cassette body portion and the second cassette body portion may be connected to each other to form the cassette body. In another embodiment, the first cassette workpiece may be defined by a first mounting plate and the second cassette workpiece may be defined by a second mounting plate, wherein the first mounting plate and the second mounting plate may be connected to the cassette body.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIGS. 10A-10C are schematic views illustrating a fiber management scheme of twisting and folding the optical fibers to form a fiber stack that fits within the confines of a cassette body in accordance with an embodiment of the disclosure;

FIGS. 11A-11C are schematic views illustrating a fiber management scheme of twisting and folding the optical fibers to form a fiber stack in accordance with another embodiment of the disclosure;

DETAILED DESCRIPTION

Figure 1:
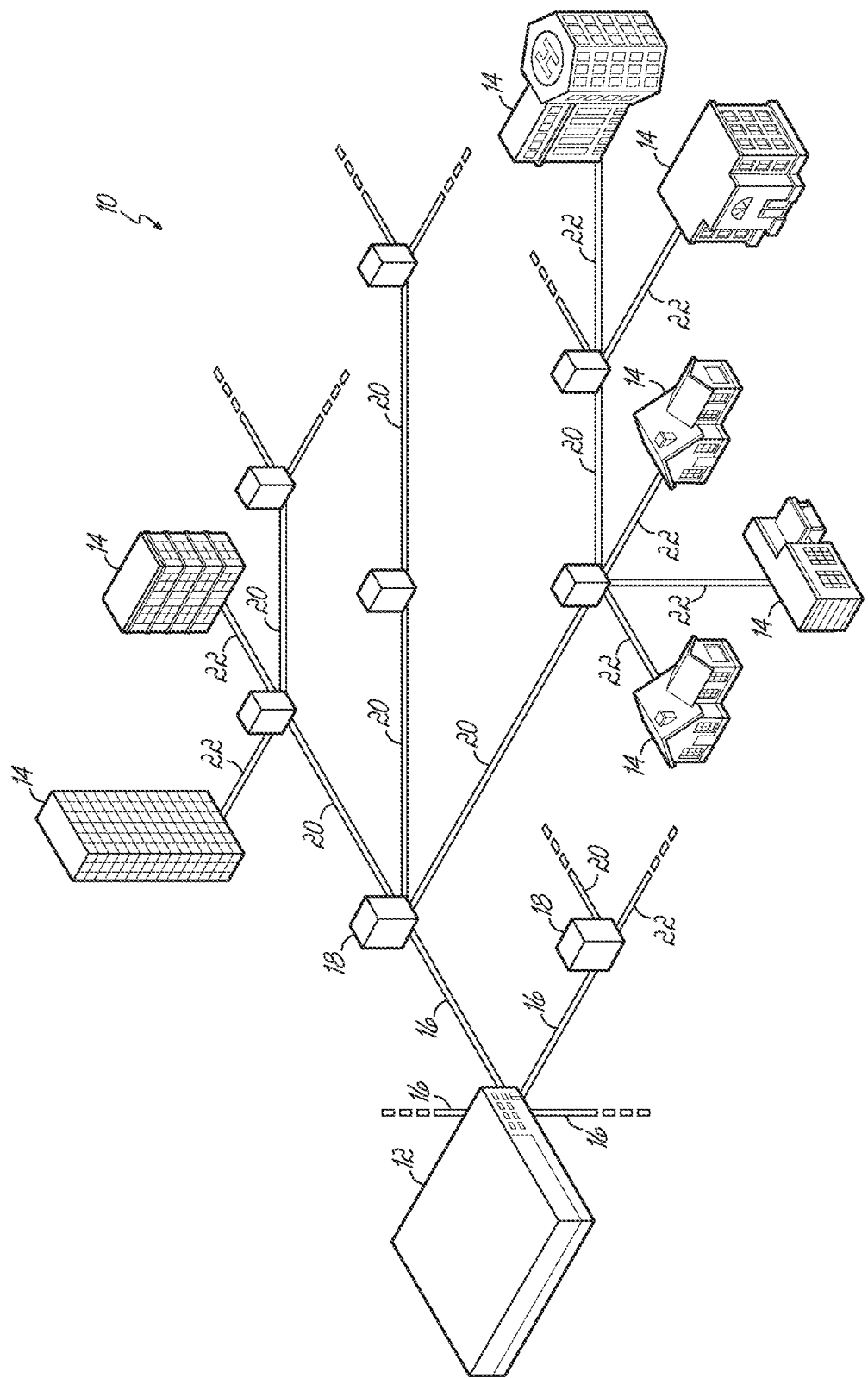
FIG. 1 is a schematic diagram of an exemplary FTTx network.

Various embodiments will be further clarified by examples in the description below. In the description, the use of ordinals in conjunction with an element is solely for distinguishing what might otherwise be similar or identical labels, such as "first portion" and "second portion," and does not imply a priority, a type, an importance, or other attribute, unless otherwise stated. Additionally, terms "upper," "lower," and similar terms are used for convenience of describing the accompanying drawings and are not intended to limit this disclosure. For example, the terms "upper edge" and "lower edge" are used with specific reference to the drawings as illustrated, and the embodiments may be in other orientations in use.

In general, the description generally relates to an improved method of assembling a WDM cassette that addresses many of the drawbacks of current cassettes described above. In a first aspect, the length of optical fibers associated with I/O and reflective ports of wavelength filters is controlled to provide an organized arrangement of the optical fibers within the cassette. More particularly, the length of the optical fibers associated with the I/O and reflective ports is correlated to a dimension or periphery of a cassette body which carries the wavelength filters and optical fibers. Additionally, a twist-and-fold process may be used on the optical fibers to produce a looped fiber stack that is organized and fits within the confines of the cassette body. The end result is a WDM cassette having optical fibers (with sufficient length for rework purposes) highly organized within the confines of the cassette body.

The term "looped fiber" or "fiber loop" (or simply "loop") in this disclosure refers an optical fiber link, which may be defined by optical fibers having ends spliced together, having the ability to be arranged in a generally circular configuration. Thus, an optical fiber link can be a fiber loop even if stored/used in a non-circular configuration as long as the optical fiber link retains the ability to have a generally circular configuration (e.g., when not stored). Opposite ends of the optical fiber link extend from and return to a common reference, which may be a structural element (e.g., a cassette body) or intersection point (e.g., where the optical fiber link crosses over itself).

In a second aspect, an improved method of assembling a WDM cassette is disclosed. In the method, the components of the WDM cassette, including wavelength filters, are initially arranged on a pair of separate cassette workpieces and optical fibers (optionally including one or more com fibers) associated with I/O and reflective ports of the wavelength filters are organized and cut to a predetermined length according to the first aspect mentioned above. The optical fibers from the respective cassette workpieces are then coupled together through a mass fusion splice process, such as a mass fusion ribbon splice process. A mass fusion splice process is labor and time efficient and produces more consistent, higher quality fusion splices as compared to single splice processes used in the prior art. Subsequent to the mass fusion splice process, the cassette workpieces are arranged to form a cassette body or are incorporated into the cassette body and the optical fibers, including the mass fusion splice, are organized according to the first aspect described above.

Figure 3:
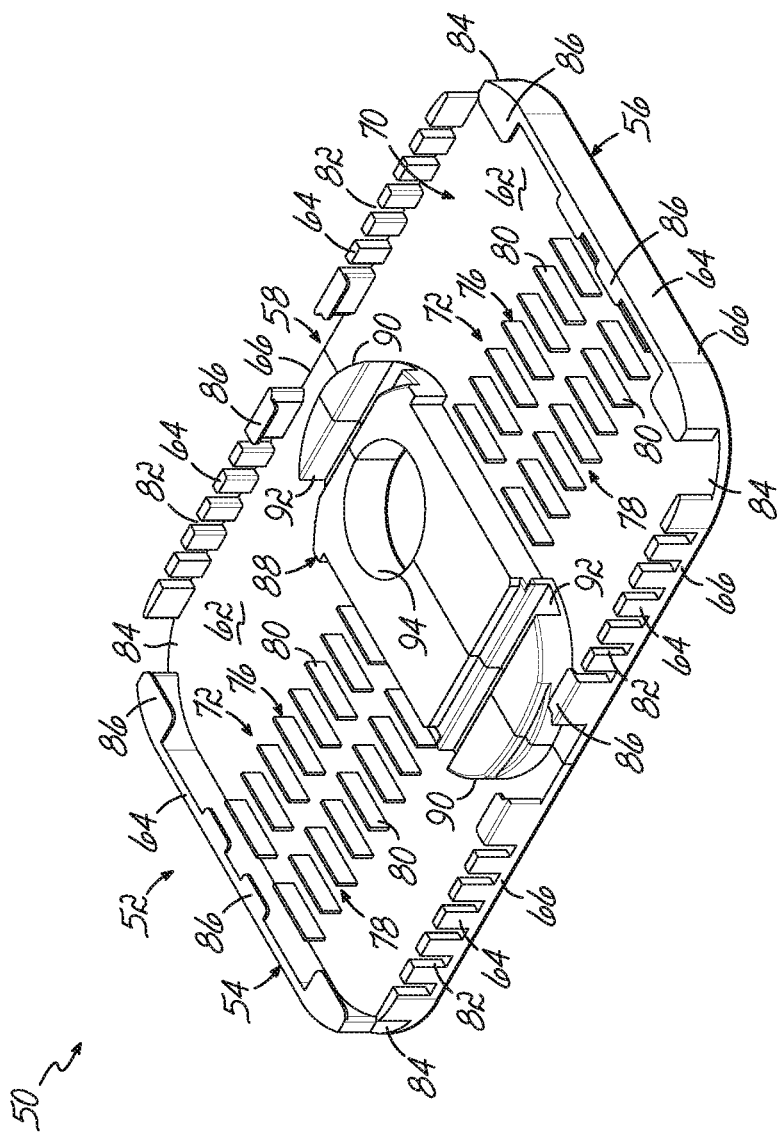
FIG. 3 is a perspective view of a WDM cassette in accordance with an embodiment of the disclosure.
Figure 4:
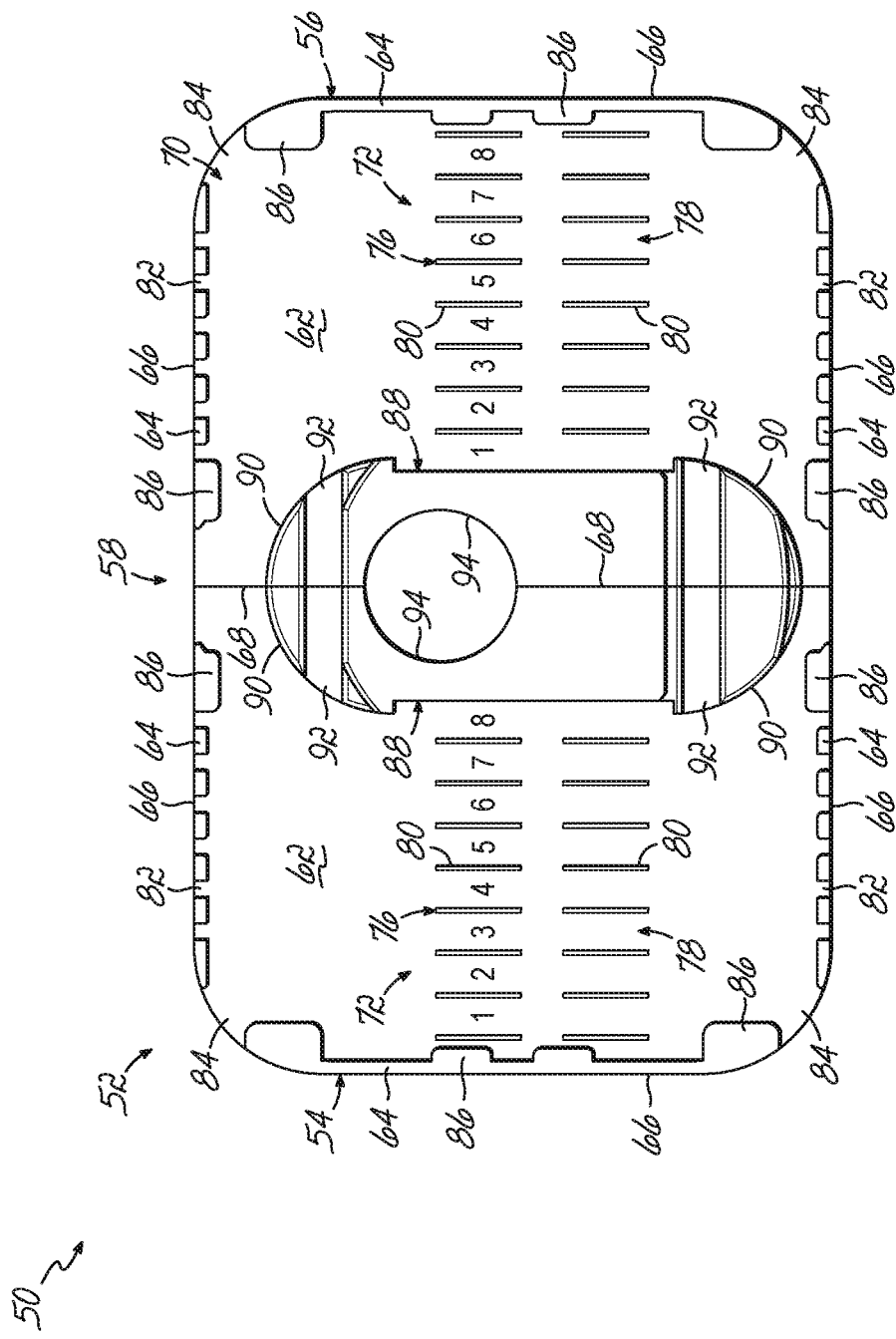
FIG. 4 is a top plan view of the WDM cassette illustrated in FIG. 3.
Figure 5:
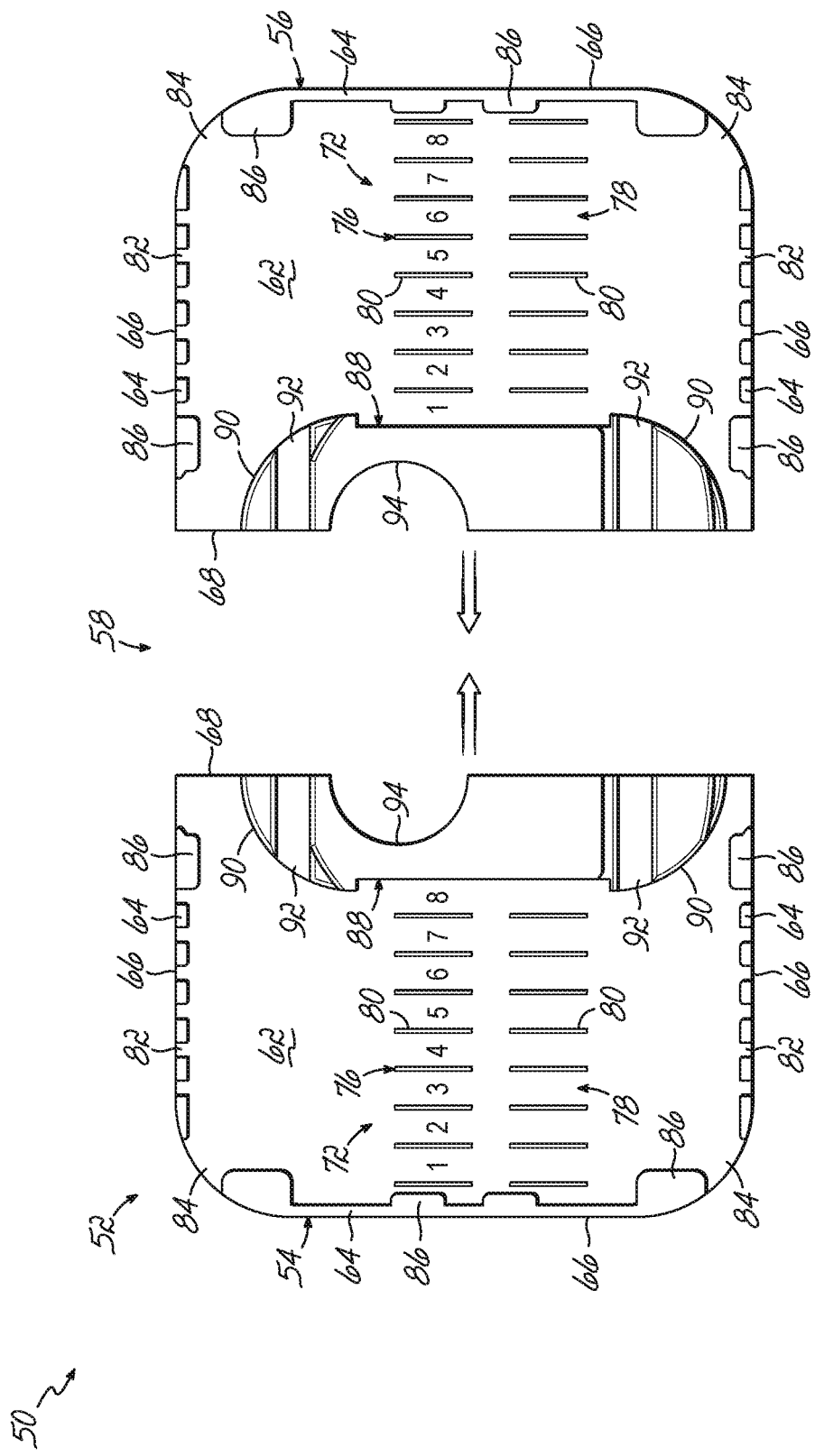
FIG. 5 is a disassembled top plan view of the WDM cassette illustrated in FIGS. 3 and 4.

FIGS. 3-5 illustrate a WDM cassette 50 in accordance with an embodiment of the present disclosure, where internal components, such as wavelength filters and optical fibers, have been omitted for clarity. The WDM cassette 50 includes a cassette body 52 formed from a first cassette body portion 54 and a second cassette body portion 56. The first and second cassette body portions 54, 56 are separable from each other, but may be selectively connected to each other at a connection interface 58 to form the WDM cassette 50.

As will be discussed in detail below, the ability to separate the cassette body 52 into the first and second cassette body portions 54, 56 allows each portion to be assembled with internal components of the cassette separately and the optical fibers associated with the respective portions to be organized and managed in an improved manner not appreciated by the prior art. In other words, the improved manner in which the optical fibers are managed is made possible at least in part by the cassette body 52 being separable into two discrete cassette body portions 54, 56 that may be assembled with internal components of the cassette (e.g., three-port WDM devices) and subsequently connected together to form the WDM cassette 50.

In the embodiment shown, the first and second cassette body portions 54, 56 are essentially mirror images of each other and a description of first cassette body portion 54 will suffice as a description of second cassette body portion 56 as well. First cassette body portion 54 will be referred to simply as "cassette body portion 54" for convenience since the description may apply equally to the second cassette body portion 56. In alternative embodiments, first and second cassette body portions may have different designs yet still provide at least some of the advantages set out in this disclosure.

Cassette body portion 54 includes a generally rectangular and planar base wall 62 and upturned sidewalls or flanges 64 along upper, lower, and outer side edges 66 of the base wall 62. One inner side edge of the base wall 62 operates as a connection edge 68 for mating with the connecting edge 68 of the second cassette body portion 56 at a connection interface 58, as is illustrated in FIG. 4, for example. The base wall 62 and flanges 64 collectively define an interior cavity 70 for receiving components of the WDM cassette 50.

Figure 7A:
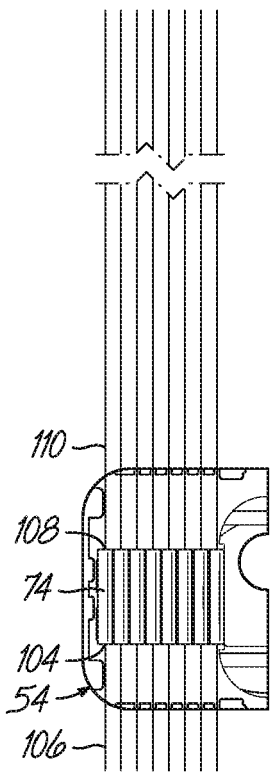
FIGS. 7A and 7B are schematic views illustrating the arrangement of wavelength filters and associated optical fibers on cassette workpieces in accordance with an aspect of the disclosure.

In one embodiment, the base wall 62 includes a filter region 72 in a central portion of the cavity 70 configured to receive a plurality of wavelength filters 74 in, for example, a side-by-side arrangement (e.g., see FIG. 7A). In this embodiment, the filter region 72 includes a plurality of dividing walls 76 arranged generally parallel to each other to define slots 78 that receive the wavelength filters 74. In the embodiment shown, the cassette body portion 54 is configured to include eight slots 78 for receiving eight wavelength filters 74. It should be understood, however, that the number of dividing walls 76 and slots 78 may vary depending on the configuration of the WDM cassette 50. In one embodiment (not shown), each dividing wall 76 may be formed from a single continuous panel. In an alternative embodiment, however, each dividing wall 76 may be formed from a plurality of panel portions 80 (two shown in the figures) having gaps between the adjacent aligned panel portions 80. The distance between the dividing walls 76 generally corresponds to the width of the wavelength filters 74 (e.g., just slightly wider than the width of the wavelength filters 74) and facilitates organizing and securing the wavelength filters 74 within the cavity 70 of the cassette body portion 54.

In an exemplary embodiment, the flanges 64 extending from the upper and lower edges 66 may include a plurality of slots 82 open to an upper edge of the associated flange 64 and generally aligned with upper and lower ends of the filter slots 78 in the filter region 72 of the cassette body portion 54. The slots 82 may allow optical fibers associated with the wavelength filters 74 (such as optical fibers associated with I/O and reflective ports of the filters) to be organized during assembly of the WDM cassette 50, as will be explained in detail below. Alternatively, the slots 82 may allow optical fibers associated with the wavelength filters 74 (such as optical fibers associated with the transmission ports of the filters) to exit the WDM cassette 50 for connection to another optical fiber component. In addition to the above, if desired, slots 84 may also be provided at the upper and lower corners of the cassette body portion 54 for similar purposes. The slots 82, 84 may penetrate the full height of the flanges 64, or alternatively may penetrate just a portion of the height of the flanges 64.

In an exemplary embodiment, an outer flange 64 of the cassette body portion 54 may include one or more features for handling optical fibers associated with the WDM cassette 50 and securing the optical fibers to the WDM cassette 50. For example, an upper edge of the outer flange 64 may include a plurality of inwardly extending tabs 86 extending along a portion of length of the outer flange 64. The tabs 86 create a space or cavity between the base wall 62 and the underside of the tabs 86 for receiving optical fibers associated with the WDM cassette 50 and hold the fibers down against a spring-back tendency of the organized optical fibers or other undesired movements. The length of the tabs 86 and the spacing between adjacent tabs 86 may vary to meet the needs of a particular application. In any event, the tabs 86 are configured to at least partially define a routing path for the optical fibers of the WDM cassette 50 and organize the optical fibers by, amongst other aspects, maintaining positional control of the optical fibers within the WDM cassette 50. The upper and lower flanges 64 may similarly include tabs 86 for managing optical fibers within the WDM cassette 50. Such tabs 86 may be, for example, adjacent the connection edge 68 of the cassette body portion 54, as illustrated in the figures.

In a further exemplary embodiment, the cassette body portion 54 may include a raised boss 88 adjacent the connection edge 68 and between the upper and lower edges 66 of the cassette body portion 54. Upper and lower ends 90 of the raised boss 88 may be curved or arcuate in shape and effectively operate as fiber guides that mitigate excessive bending or folding of optical fibers associated with the WDM cassette 50. In one embodiment, at least one end 90, and preferably each of the ends 90, of the raised boss 88 includes a transverse slot or channel 92 that is open at an outer edge of the raised boss 88 and open at the connection edge 68 as well. As will be discussed in more detail below, the channel 92 is configured to receive a mass fusion splice (e.g., a protective sheath of the mass fusion splice) of optical fibers from I/O and reflective ports of the wavelength filters 74. Furthermore, the raised boss 88 may include a retention cavity 94 open to the connection edge 68 of the cassette body portion 54. In one embodiment, the retention cavity 94 may be semicircular in shape. It should be recognized, however, that other shapes may be possible. As discussed below, the retention cavity 94 is configured to secure the position of the WDM cassette 50 within a terminal of a fiber optic network, such as the fiber optic network 10 illustrated in FIG. 1.

As discussed above, one aspect of this disclosure is that the WDM cassette 50 may be formed by separable cassette body portions 54, 56 that are connectable during the assembly process to form the complete cassette body 52. For example, the connection edge 68 of each cassette body portion 54, 56 may include one or more connection elements (not shown) that facilitate the connection between the cassette body portions 54, 56. By way of example and without limitation, the connection edges 68 of the cassette body portions 54, 56 may include pins and recesses that engage with each other when the connection edges 68 of the cassette body portions 54, 56 abut each other. The pins and recesses may maintain engagement through a snap fit connection or through a magnetic connection, for example. Alternatively or additionally, various adhesives may be used to maintain the connection between the cassette body portions 54, 56. The connection between the two cassette body portions 54, 56 may be permanent (e.g., using adhesives or other bonding agents), or may be selectively reversible (e.g., using fasteners). Thus, a wide range of connection elements may be used to join the cassette body portions 54, 56 at the connection interface 58 and aspects of this disclosure should not be limited to any one type of connection element.

In one embodiment, the cassette body portions 54, 56 may be formed from a suitable metal, such as aluminum. Alternatively, the cassette body portions 54, 56 may be formed from a suitable plastic material through, for example, a molding process. Still further, the cassette body portions 54, 56 may be formed through an additive manufacturing process using, for example, 3-D printing technologies. As such, it should be understood that the cassette body portions 54, 56 may be formed from a wide range of materials by a wide range of manufacturing processes and aspects of this disclosure should not be limited to any particular material or process.

Figure 6:
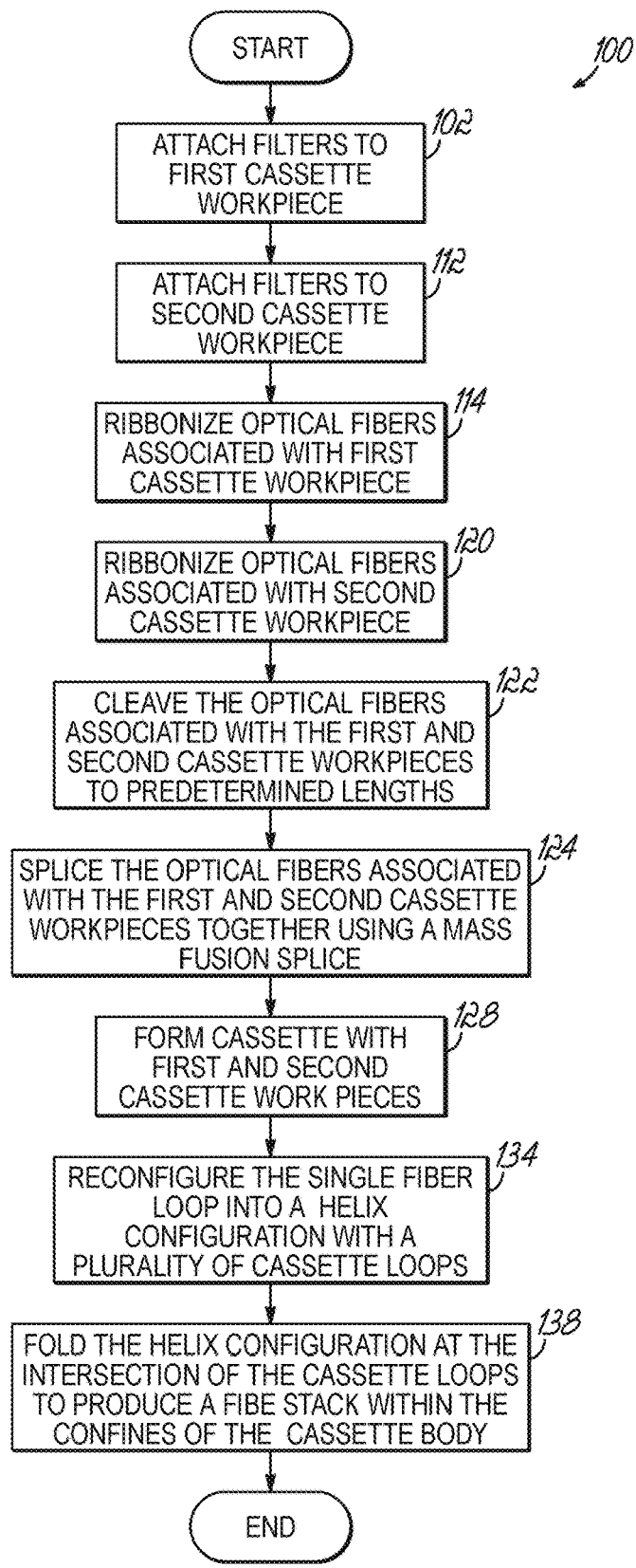
FIG. 6 is a flow chart of an example process for assembling a WDM cassette in accordance with an embodiment of the disclosure.

FIG. 6 illustrates a flowchart of an illustrative method or process 100 for assembling a WDM cassette in accordance with an embodiment of this disclosure. Aspects of the process 100 will be explained in reference to WDM cassette 50. In the process 100, the first and second cassette body portions 54, 56 are initially separate from each other, thereby allowing operators and technicians to separately and potentially simultaneously develop subassemblies that will ultimately come together to form the WDM cassette 50. In a first step 102, and as illustrated in FIG. 7A, a plurality of wavelength filters 74 may be positioned in respective filter slots 78 in the filter region 72 of the first cassette body portion 54. For example, the wavelength filters 74 may be bonded within their respective slots 78 using a suitable adhesive. Other means for securing the wavelength filters 74 within the slots 78, such as various tapes and fasteners, may alternatively or additionally be used.

The wavelength filters 74 are generally known in the optical communications industry such that a detailed description of the structure and operation of the wavelength filters 74 is not necessary. Similar to the background section above, however, each wavelength filter 74 may be a three-port WDM device including a transmission port 104 at a lower end of the wavelength filter 74 from which an optical fiber 106 extends, and an I/O port and reflective port, collectively denoted at 108, at an opposite upper end from which a pair of optical fibers 110 extend. In one embodiment, the wavelength filters 74 are oriented in their respective slots 78 such that the transmission ports 104 generally face the lower flange 64 and the I/O and reflective ports 108 generally face the upper flange 64. With the wavelength filters 74 oriented in this manner and secured to the first cassette body portion 54, the optical fibers 110 from the I/O and reflective ports 108 may be inserted through the fiber slots 82 in the upper flange 64 so as to extend away from the first cassette body portion 54. As mentioned above, the fiber slots 82 aid in organizing the optical fibers 110 from the wavelength filters 74 and distributing the optical fibers 110 along the upper flange 64 such that the optical fibers 110 may be arranged in a substantially straight manner. The optical fibers 106 from the transmission ports 104 may also be inserted through the fiber slots 82 in the lower flange 64 of the first cassette body portion 54.

Figure 7B:
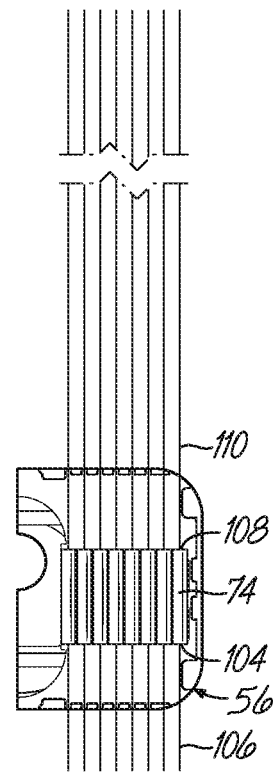

In a next step 112 of the assembly process 100, and as illustrated in FIG. 7B, a plurality of wavelength filters 74 may be positioned in respective filter slots 78 in the filter region 72 of the second cassette body portion 56 in a manner similar to that described above for the first cassette body portion 54. The optical fibers 110 from the I/O and reflective ports 108 may be inserted through the fiber slots 82 in the upper flange 64 so as to extend away from the second cassette body 56 in a substantially straight manner. The optical fibers 106 from the transmission ports 104 may also be inserted through the fiber slots 82 in the lower flange 64 of the second cassette body portion 56. In one embodiment, since the first and second cassette body portions 54, 56 are initially separate from each other, the assembly of the wavelength filters 74 with the first and second cassette body portions 54, 56 and the arrangement of the optical fibers 110 from the wavelength filters 74 may be accomplished adjacent to each other on, for example, a suitable work surface, and at substantially the same time. Aspects of this disclosure, however, are not so limited as these steps may be accomplished on different work surfaces and/or at different times.

Figure 2:
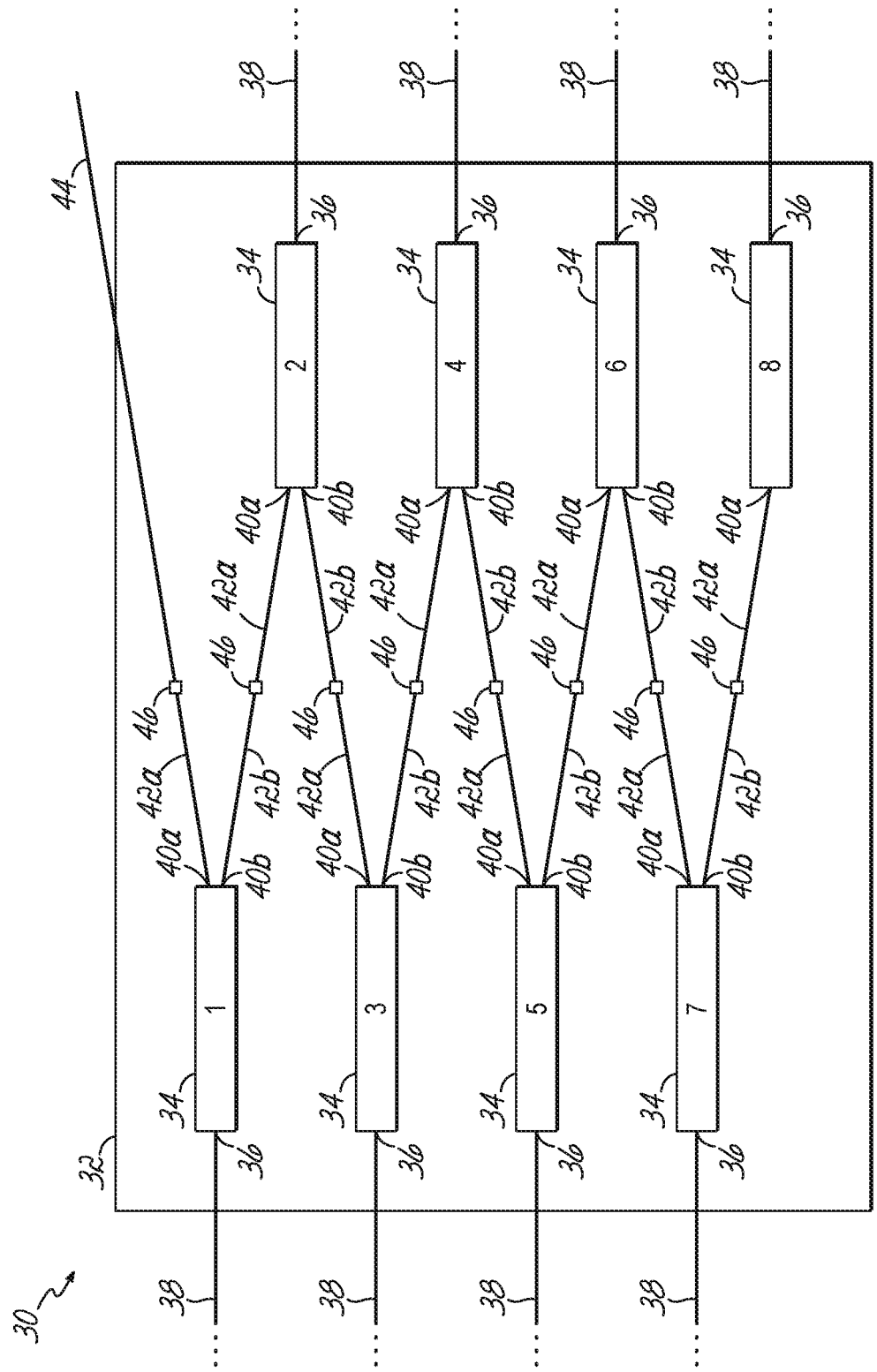
FIG. 2 is a schematic diagram of a WDM cassette according to the prior art.

With the wavelength filters 74 positioned in the first and second cassette body portions 54, 56, the optical fibers 110 associated with the first cassette body portion 54 may be optically connected to the optical fibers 110 associated with the second cassette body portion 56, optionally along with one or more com fibers to the WDM cassette 50 (not shown), to achieve a desired concatenation sequence, such as the concatenation sequence illustrated in FIG. 2. In the description that follows, it should be understood that reference to optical fibers 110 may or may not include one or more com fibers associated with one or each of the first and second cassette body portions 54, 56. In one aspect of this disclosure, the optical fibers 110 may be optically connected using a mass fusion splice, where a relatively large number of fusion splices are made in a single or few processing steps. Using a mass fusion splice reduces the time and cost for achieving the optical connection between the optical fibers 110 of the two cassette body portions 54, 56 and reduces the likelihood of defects in the optical connections, resulting in higher manufacturing yields and less rework.

Figure 7C:
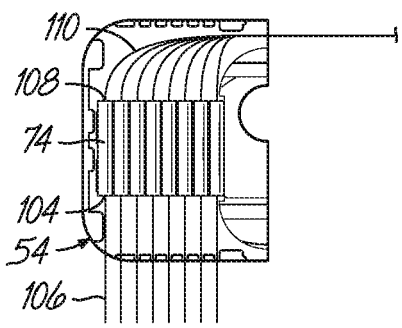
FIGS. 7C and 7D are schematic views illustrating the arrangement of the optical fibers in a pre-bend configuration prior to a ribbonization process.

In an exemplary embodiment, a mass fusion ribbon splice process may be used to optically connect the optical fibers 110 from the first and second cassette body portions 54, 56. In a mass fusion ribbon splice process, and in accordance with a third step 114 of the process 100, the optical fibers 110 from the first cassette body portion 54 may be subjected to a ribbonization process. The ribbonization process may include initially arranging the plurality of optical fibers 110 from the first cassette body portion 54 in a pre-bend configuration as illustrated in FIG. 7C, for example. Arranging the optical fibers 110 from the first cassette body portion 54 in the pre-bend configuration avoids length differences in the optical fibers 110 during subsequent organization of the optical fibers 110 within the WDM cassette 50, as discussed in more detail below. Once in the pre-bend configuration, the ribbonization process may further include arranging end sections of the optical fibers 110 from the first cassette body portion 54 in a single side-by-side row. Other arrangements of the optical fibers 110 may also be possible for a mass fusion splice process.

Figure 8:
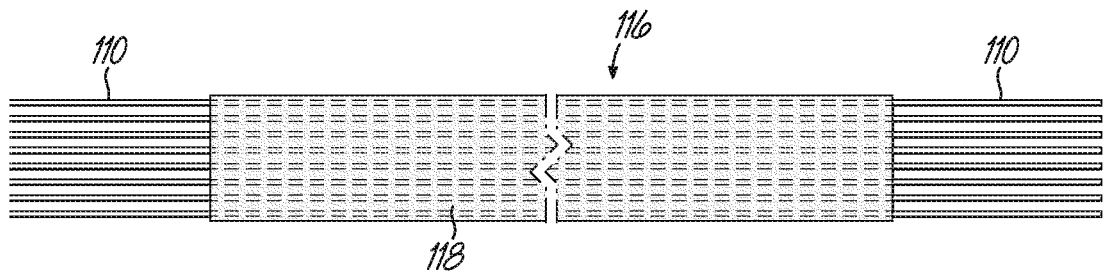
FIG. 8 is a schematic view illustrating the optical fibers shown in FIGS. 7C and 7D following a ribbonization process.

In one embodiment, the desired arrangement may be achieved using a clamp or clip (not shown) to fix the position of the optical fibers 110 relative to each other in the desired configuration. Once fixed, a curable polymer material may be applied to at least a section of the optical fibers 110 adjacent to terminal ends of the optical fibers 110 (i.e., ends opposite to the ends at the I/O and reflective ports 108). For example, just a small section of the optical fibers 110 from the first cassette body portion 54 adjacent the terminal ends thereof may be subject to the ribbonization process. The small section that is ribbonized may or may not include the terminal ends. Alternatively, nearly the entire length of the optical fibers 110 extending from the first cassette body portion 54 may be subject to the ribbonization process. In any event, as illustrated in FIG. 8, upon the applied material curing, a ribbonized section 116 may be formed, in which the optical fibers 110 are embedded/encapsulated within a polymer matrix or cover 118. The ribbonization process not only organizes the optical fibers 110 into a desired configuration, but also improves the handling of the optical fibers 110 for the mass fusion splicing process.

Figure 7D:
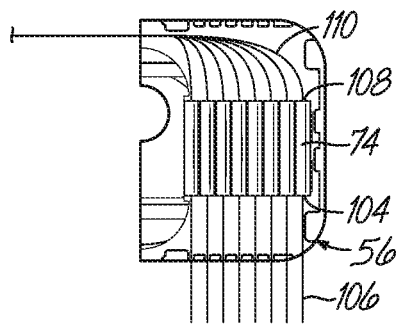

In a fourth step 120 of the process 100, the plurality of optical fibers 110 associated with the second cassette body portion 56 may also be subjected to the ribbonization process described above. In this regard, FIG. 7D illustrates the optical fibers 110 from the second cassette body portion 56 in a pre-bend configuration, and FIG. 8 can be considered as also being illustrative of a ribbonized section 116 of the optical fibers 110 from the second cassette body portion 56. In other words, FIG. 8 may represent a ribbonized section 116 of either the optical fibers 110 from the first cassette body portion 56 or the optical fibers 110 from the second cassette body portion 56. Those of ordinary skill in the art will know how to arrange the optical fibers 110 from the second cassette body portion 56 in anticipation of mass fusion splicing with the optical fibers 110 from the first cassette body portion 54 to achieve the concatenation sequence that performs the desired multiplexing/demultiplexing functionality of the WDM cassette 50. The ribbonization process for the optical fibers 110 of the first and second cassette body portions 54, 56 may be performed in parallel or in a serial manner.

With the optical fibers 110 from the first and second cassette body portions 54, 56 now ribbonized as described above, in a fifth step 122 of the process 100, the optical fibers 110 associated with the first and second cassette body portions 54, 56 may be cleaved to a predetermined length $L_1$ and $L_2$, respectively. The lengths $L_1$ and $L_2$ may be measured from where the optical fibers 110 exit the first body portion 54 or second body portion 56. Devices for cleaving the optical fibers 110, including ribbonized optical fibers, are generally known in the industry and therefore a further description of such a device will be omitted for sake of brevity. In one embodiment, the predetermined lengths $L_1$ and $L_2$ of the optical fibers 110 of the first and second cassette body portions 54, 56 may be substantially equal to each other. In an alternative embodiment, however, the predetermined lengths $L_1$ and $L_2$ of the optical fibers 110 may be different from each other. The predetermined lengths $L_1$ and $L_2$ of the optical fibers 110 may be selected in accordance with a fiber management scheme that will be discussed in more detail below. In any event, the ribbonized optical fibers 110 may be inserted into a cleaving device (not shown) and the optical fibers 110 cleaved to the predetermined lengths in accordance with the fiber management scheme.

Subsequent to cleaving the optical fibers 110 to their predetermined lengths $L_1$ and $L_2$, in a further step 124 of the process 100, the ribbonized optical fibers 110 from the first and second cassette body portions 54, 56 may be spliced together via the mass fusion ribbon splicing process. Similar to what was mentioned for cleaving above, devices for performing a mass fusion ribbon splice are generally known and a detailed description of such a device will be omitted for sake of brevity. In an exemplary mass fusion splice process, a ribbon splice protector 126 is first positioned over one group of ribbonized optical fibers 110 (e.g., either the optical fibers 110 from the first cassette body portion 54 or the optical fibers 110 from the second cassette body portion 56). If the optical fibers 110 include outer insulative layers, those layers may be stripped away to expose the bare optical fibers 110 in a manner generally known in the industry. The exposed ends of the optical fibers 110 from the first cassette body portion 54 and the exposed ends of the optical fibers 110 from the second cassette body portion 56 may be inserted into the splicing device (not shown), and the device may be activated to then fuse the ends of the optical fibers 110 together. Next, the ribbon splice protector 126 may be slid over the fused ends of the optical fibers 110 and heated to conform (e.g., by shrinking) to the optical fibers 110 and protect the fusion splice joint. The connection of the optical fibers 110 by way of the mass fusion splice also results in the wavelength filters 74 becoming concatenated. Thus, in a single mass fusion splicing process, the concatenation sequence of the I/O and reflective ports 108 of the wavelength filters 74 associated with the first and second cassette body portions 54, 56 is achieved.

Figure 9:
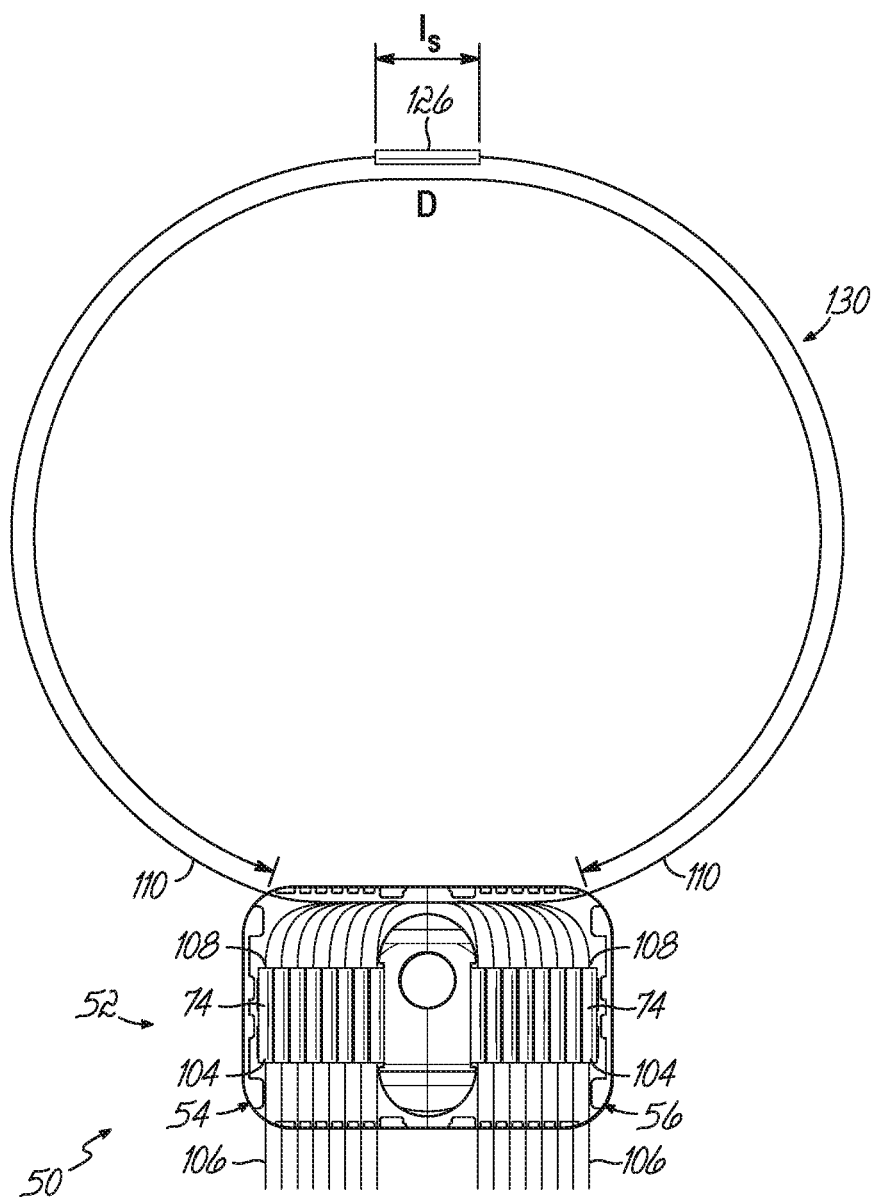
FIG. 9 is a schematic view illustrating the optical fibers shown in FIGS. 7C and 7D joined by a mass fusion splice and arranged in a main fiber loop.

In a next step 128 of the process 100, the first and second cassette body portions 54, 56 may be connected together to form the WDM cassette 50. More particularly, the cassette body portions 54, 56 may be joined at the connection interface 58 by, for example, coupling the connection edges 68 of the first and second cassette body portions 54, 56 together. After joining the first and second cassette body portions 54, 56 together, the optical fibers 110 may be arranged to form a single, relatively large main fiber loop 130, as illustrated in FIG. 9, for example. As illustrated in this figure, the optical fibers 110 from the first cassette body portion 54 and the optical fibers 110 from the second cassette body portion 56 may cross each other adjacent the connection interface 58 and exit the WDM cassette 50 at opposite corner slots 84 (FIGS. 3-5). The total length of the main fiber loop 130 is denoted by D and is measured from the exit location of the optical fibers 110 from the WDM cassette 50. The length D of the main fiber loop 130 is approximately equal to the sum of the first and second fiber lengths $L_1$ and $L_2$.

The main fiber loop 130 not only includes the optical connection between the optical fibers 110 of the wavelength filters 74 to achieve the desired concatenation sequence (e.g., via the mass fusion splice), but also represents the excess fiber length that allows the WDM cassette 50 to be reworked a number of times so that the WDM cassette 50 may be used in different applications, for example. As discussed above, one aspect of the disclosure is to provide an organized arrangement of the optical fibers 110 in the WDM cassette 50. From a broad perspective, and in an exemplary embodiment of a fiber management scheme, the main fiber loop 130 may be manipulated or reconfigured into a plurality of smaller coils that are each sized to fit within the confines of the cassette body 52 without further folds, backbends, etc. The smaller coils formed from the main fiber loop 130 are referred to herein as "cassette loops."

To this end, and in further reference to FIG. 6 and FIGS. 10A-10O, in a next step 134 of the process 100, the single, main fiber loop 130 may be arranged into a helix configuration 136 having a plurality of cassette loops 132 arranged in series with each other. The number of cassette loops 132 may be denoted by n and represents the possible number of reworks for the WDM cassette 50. In an exemplary embodiment, the helix configuration 136 may be achieved by gently twisting the main fiber loop 130 of optical fibers 110 a total of (n-1) times to produce n cassette loops 132 (e.g., think about twisting a rubber band to form a helix structure). For example, FIG. 10A illustrates the main fiber loop 130 twisted once to produce two cassette loops 132. Additional twists and cassette loops are possible depending on, for example, the particular application.

In a next step 138 of the process 100, the helix configuration 136 may be folded about intersection point(s) 140 between adjacent cassette loops 132 to produce a fiber stack 142 consisting of n generally vertically arranged cassette loops 132. Because each cassette loop 132 is sized to fit within the confines of the cassette body 52, the fiber stack 142 similarly fits within the confines of the cassette body 52. The fiber stack 142 may be secured to the WDM cassette 50 using the various fiber management features of the WDM cassette 50, including, for example, the tabs 86. Additionally, the ribbon splice protector 126 may be arranged to be received within a channel 92 in the bosses 88 of the WDM cassette 50. Other means of securing the fiber stack 142 to the WDM cassette 50 may also be employed. As can be appreciated, excess length of the optical fibers 110 is highly organized within the WDM cassette 50.

In accordance with the fiber management scheme, the total length D of the main fiber loop 130 may be related to the size of the cassette body 52. In one embodiment, the total length D of the main fiber loop 130 may be related to the cassette body 52 according to the following equation:

$$D=nU+l_s, \qquad (1)$$

where n is the number of cassette loops 132 to be included in the WDM cassette 50, U is the length of each cassette loop 132, and $l_s$ is the length of the mass fusion splice.

As illustrated in FIG. 10A, the cassette loops 132 are subsets of the main fiber loop 130 configured to fit within the confines of the cassette body 52 without further folds, backbends, etc. The cassette loop 132 may take a variety of shapes, including circular, elliptical, rectangular, square, etc., and U is the length (e.g., circumference/perimeter) of the cassette loop 132 for any particular shape. The size of the cassette loop 132 is generally limited by the configuration of the cassette body 52. For example, if the cassette loop 132 is circular in shape, the diameter of the cassette loop 132 may be limited by the lesser of the height and width of the cassette body 52. In a further embodiment, if the cassette loop 132 is elliptical in shape, the major axis of the ellipse may be limited by the larger dimension of the cassette body 52 and the minor axis of the ellipse may be limited by the smaller dimension of the cassette body 52. In still a further embodiment, if the cassette loop 132 is rectangular, the length and width of the cassette loop 132 may be limited by the length and width of the cassette body 52. In general, in embodiments where the cassette body 52 is configured to store the optical fibers 110 in one or more peripheral portions of the cassette body, the size of a cassette loop 132 is related to a dimensional aspect of the cassette body 52. In an exemplary embodiment, the length of the cassette loop 132 may be about (e.g., +/-10%) the perimeter of the inner cavities 70 formed when the first and second cassette body portions 54, 56 are joined.

In an exemplary embodiment, the amount of excess fiber length in the WDM cassette 50 (e.g., for subsequent rework of the optical fibers 110) may be a multiple (e.g., an integer multiple) of the cassette loop length U. This maintains the organization of the excess optical fiber within the WDM cassette 50 and provides for the cassette loops 132 to be arranged in an orderly stack within the WDM cassette 50.

The value of n may be determined by the specific application but may be between about 2 and 5 in exemplary embodiments. Other values outside of this range may also be possible. Furthermore, in an exemplary embodiment, the length of the mass fusion splice $I_s$ may be determined by the length of the ribbon splice protector 126, for example, which may have standard lengths in the industry. By way of example, and without limitation, the length of the mass fusion splice $I_s$ may be between about 3 cm and about 8 cm, and more specifically about 4 cm. Other values, however, may be possible.

The fiber management scheme is implemented by selecting a cassette loop shape that fits within the confines of the cassette body 52 and determining the length U of the cassette loop 132. The number of cassette loops n may then be selected depending on the application. Lastly, the length of the mass fusion splice $I_s$ may be selected. With these values all known or preselected, the total length D of the single, main fiber loop 130 may be determined according to equation (1) above. With the value of D now known, the lengths $L_1$ and $L_2$ of the optical fibers 110 associated with the first and second cassette body portions 54, 56, respectively, may be determined. Thus, in the cleaving step 122 of the process 100 described above, the optical fibers 110 may be cleaved at these predetermined lengths.

Figure 11A:
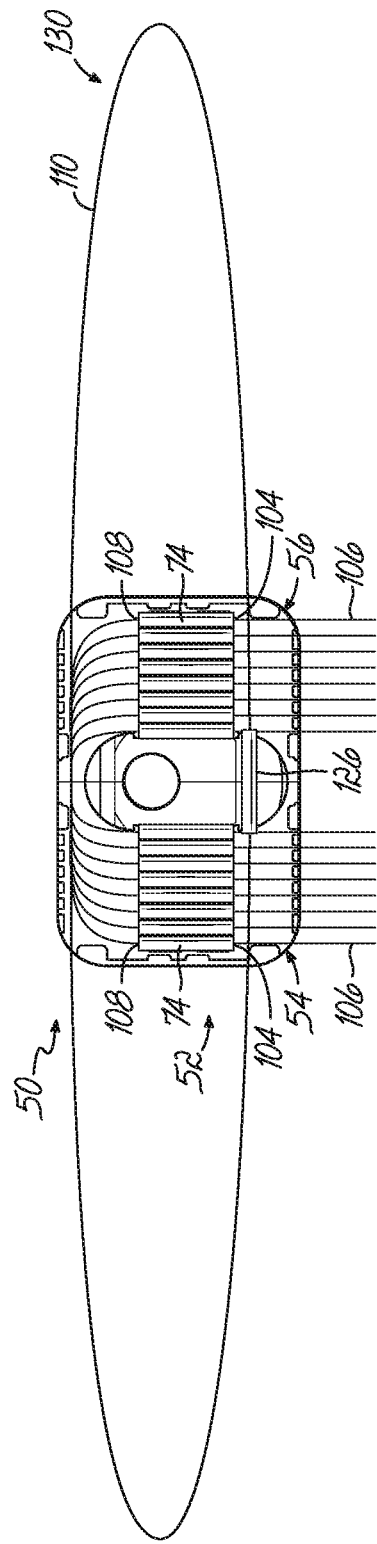

FIGS. 11A-11C illustrate steps 134 and 138 of the process 100 in accordance with another embodiment of the disclosure. The primary difference between this embodiment and that described in FIGS. 10A-10C is the orientation of the helix configuration 136. In this case, the single, main fiber loop 130 of the optical fibers 110 is initially flipped before being twisted to produce the helix configuration 136. The result, however, is the same in that a fiber stack 142 having n cassette loops 132 is provided within the confines of the cassette body 52. It should be recognized that there may be a wide range of twisting and folding sequences that produce a fiber stack 142 of n cassette loops 132 that fit within the confines of the cassette body 52 and aspects of the disclosure should not be limited to the particular embodiments shown and described herein.

While the above focused on a fiber management scheme for the optical fibers 110 associated with the I/O and reflective ports 108 of the wavelength filters 74, it should be understood that the optical fibers 106 associated with the transmission ports 104 of the wavelength filters 74 may also benefit from aspects of the fiber management scheme described above. For example, the optical fibers 106 may be ribbonized to enhance the organization and handling of the optical fibers 106. Additionally, the optical fibers 106 may be connected to each other to temporarily form a single loop (similar to main fiber loop 130) and then subjected to twisting to form a helix configuration and folding to ultimately form a fiber stack associated with the optical fibers 106. These aspects aid in organizing and managing the optical fibers 106 during the manufacturing process and prior to use of the WDM cassette 50, and may further aid in ultimately connecting the optical fibers 106 to other components of the fiber optic network.

Figure 12A:
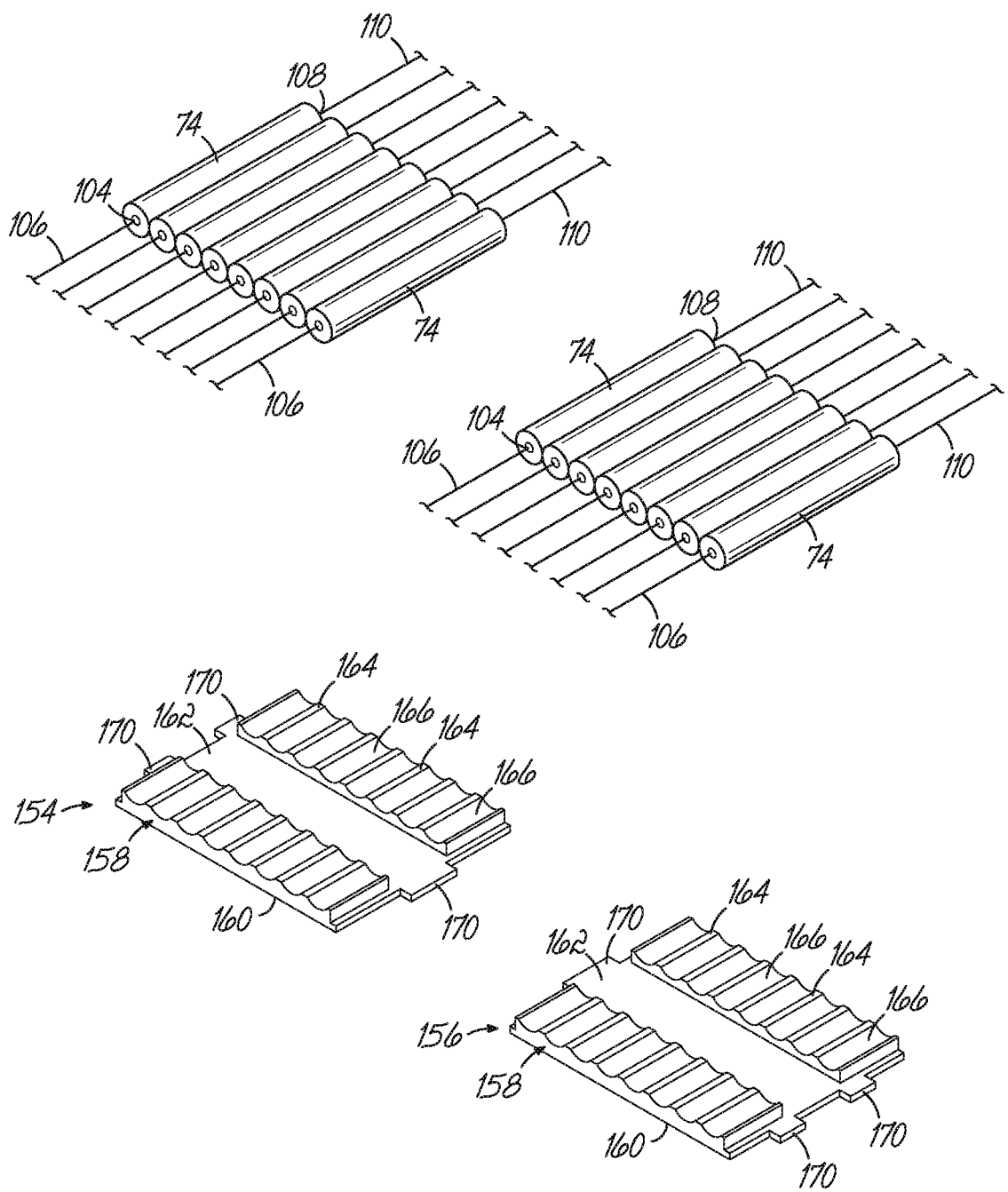
FIGS. 12A-12O are perspective views illustrating the assembly of a WDM cassette in accordance with another embodiment of the disclosure.

FIGS. 12A-12O illustrate a WDM cassette 150 in accordance with another embodiment of the disclosure. A difference between this embodiment and that shown and described above relates to the "separable" elements of the cassette. In the embodiment described above, the first cassette body portion 54 and the second cassette body portion 56 are connectable to form the cassette body 52. In effect, the first and second cassette body portions 54, 56 operate as first and second cassette workpieces that were initially separate from each other, but then joined together in the final WDM cassette 50. In the embodiment illustrated in FIGS. 12A-12O, first and second cassette workpieces are comprised of separate mounting plates 154, 156 that may be subsequently attached to a cassette body 152, such as a fully assembled cassette body 152 (e.g., unitary structure). The separate mounting plates 154, 156 provide the same advantages of the separate cassette body portions 54, 56 in terms of the attachment (concatenation) of the wavelength filters 74, organizing the optical fibers 106, 110 extending from the wavelength filters 74, and forming mass fusion optical connections (a mass fusion splice between the optical fibers 110 extending from the I/O and reflective ports 108 of the wavelength filters 74 on the first and second mounting plates 154, 156, and a mass fusion splice between the optical fibers 106 extending from the transmission ports 104 of the wavelength filters 74 on the first and second mounting plates 154, 156). The method provided in FIG. 6 generally applies to the assembly of the WDM cassette 150, but is carried out using the mounting plates 154, 156 as the cassette workpieces instead of the cassette body portions 54, 56.

Figure 12B:
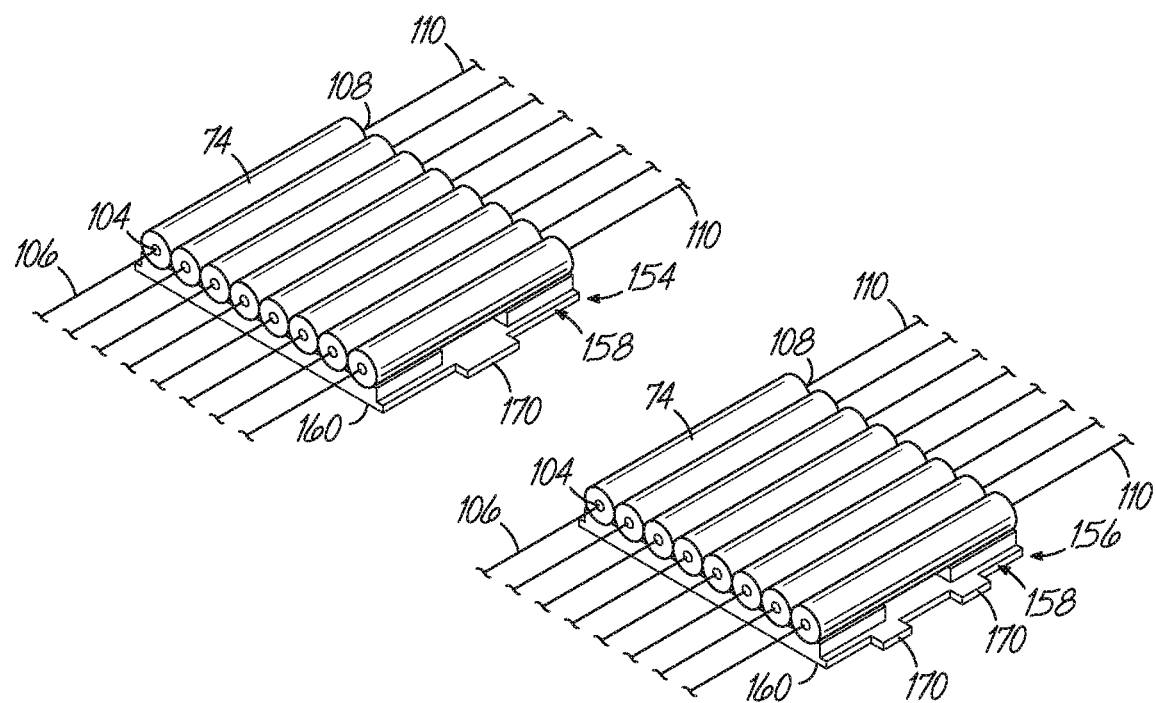

To this end, FIGS. 12A and 12B illustrate the wavelength filters 74 being attached to the mounting plates 154, 156. The mounting plates 154, 156 include a thin plate-like body 158 having a generally planar lower surface 160 and an upper surface 162. The upper surface 162 includes a plurality of ridges or ridge portions 164 arranged generally parallel to each to define slots or bays 166 that receive the wavelength filters 74. In the illustrated embodiment, the mounting plates 154, 156 are configured to include eight slots 166 for receiving eight wavelength filters 74. It should be understood, however, that the number of ridges 164 and slots 166 may vary depending on the configuration of the WDM cassette 150. The mounting plates 154, 156 may include a central channel 168 in the upper surface 162 of the mounting plates 154, 156. The mounting plates 154, 156 may also include one or more retention tabs 170 along the side edges of the mounting plates 154, 156. The retention tabs 170 facilitate the attachment of the mounting plates 154, 156 to the cassette body 152.

FIG. 12B illustrates the mounting plates 154, 156 with the wavelength filters 74 attached thereto and with the optical fibers 106, 110 extending from their respective transmission ports 104 and I/O and reflective ports, again collectively denoted at 108. FIG. 12B further illustrates that the mounting plates 154, 156 are initially separate from each other. This facilitates the performance of one or more of the steps in the method outlined in FIG. 6. By way of example and without limitation, one or more of steps 114 and 120 (directed to ribbonization of the optical fibers 106 and/or 110), 122 (directed to cleaving the optical fibers 106 and/or 110 to the predetermined lengths), and 124 (directed to the mass fusion splice) may be performed with the first and second mounting plates 154, 156 separate from each other.

Figure 12C:
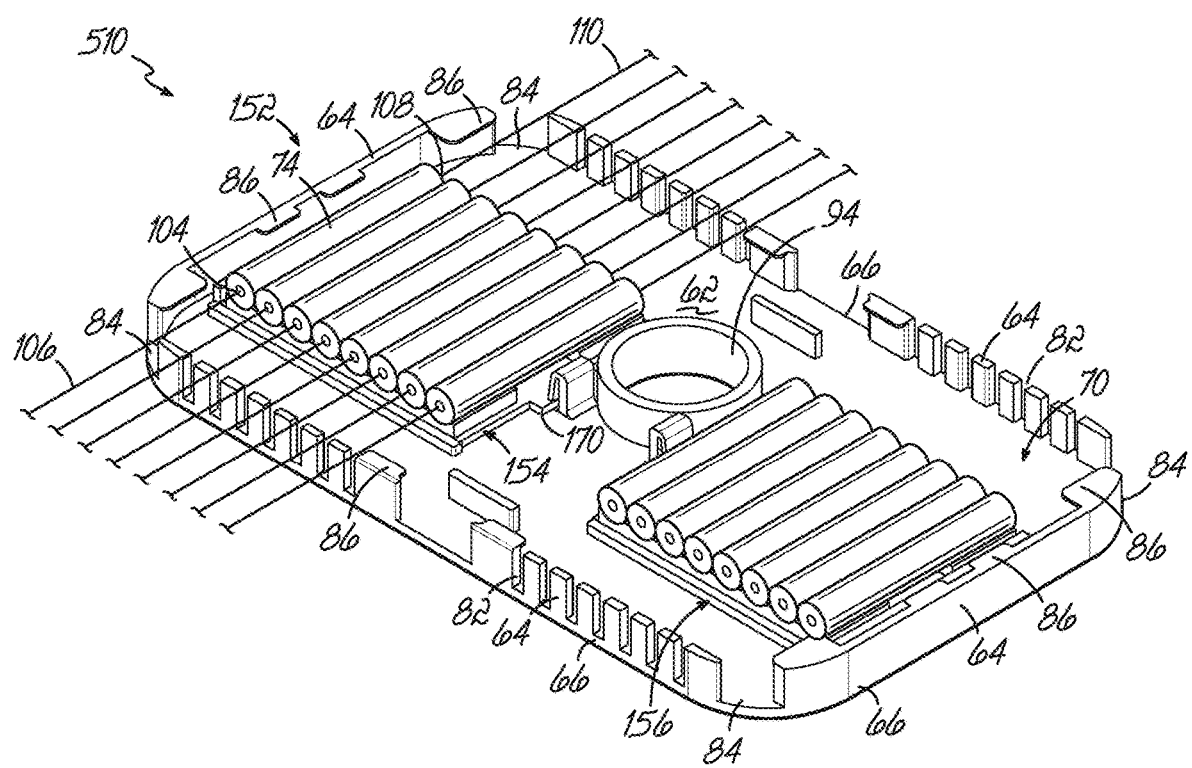

FIG. 12C illustrates the mounting plates 154, 156, with the wavelength filters 74 and associated optical fibers 106, 110, secured to the cassette body 152 of the WDM cassette 150. In this embodiment, the cassette body 152 may be a fully formed cassette body (e.g., unitary structure). To achieve the connection of the mounting plates 154, 156 to the cassette body 152, the filter region 72 of the cassette body 152 may include one or more retention clips 172 that cooperate with the retention tabs 170 on the mounting plates 154, 156 to selectively attach/couple the mounting plates 154, 156 to the cassette body 152. Thus, step 128 of the process 100 outlined in FIG. 6 is achieved by connecting the mounting plates 154, 156 to the cassette body 152 instead of connecting separate cassette body portions to each other at a connection interface(as is the case for the cassette body 52 described above). However, once the mounting plates 154, 156 are connected to the cassette body 152, the optical fibers 110 extending from the mounting plates 154, 156 and fusion spliced together may form a single, main fiber loop 130 similar to that shown in FIG. 9. From this point, steps 134 and 138 of the assembly process 100 outlined in FIG. 6 may be carried out similar to that above to produce a fiber stack 142 of cassette loops 132 that fit within the confines of the cassette body 152 of the WDM cassette 150.

Figure 13:
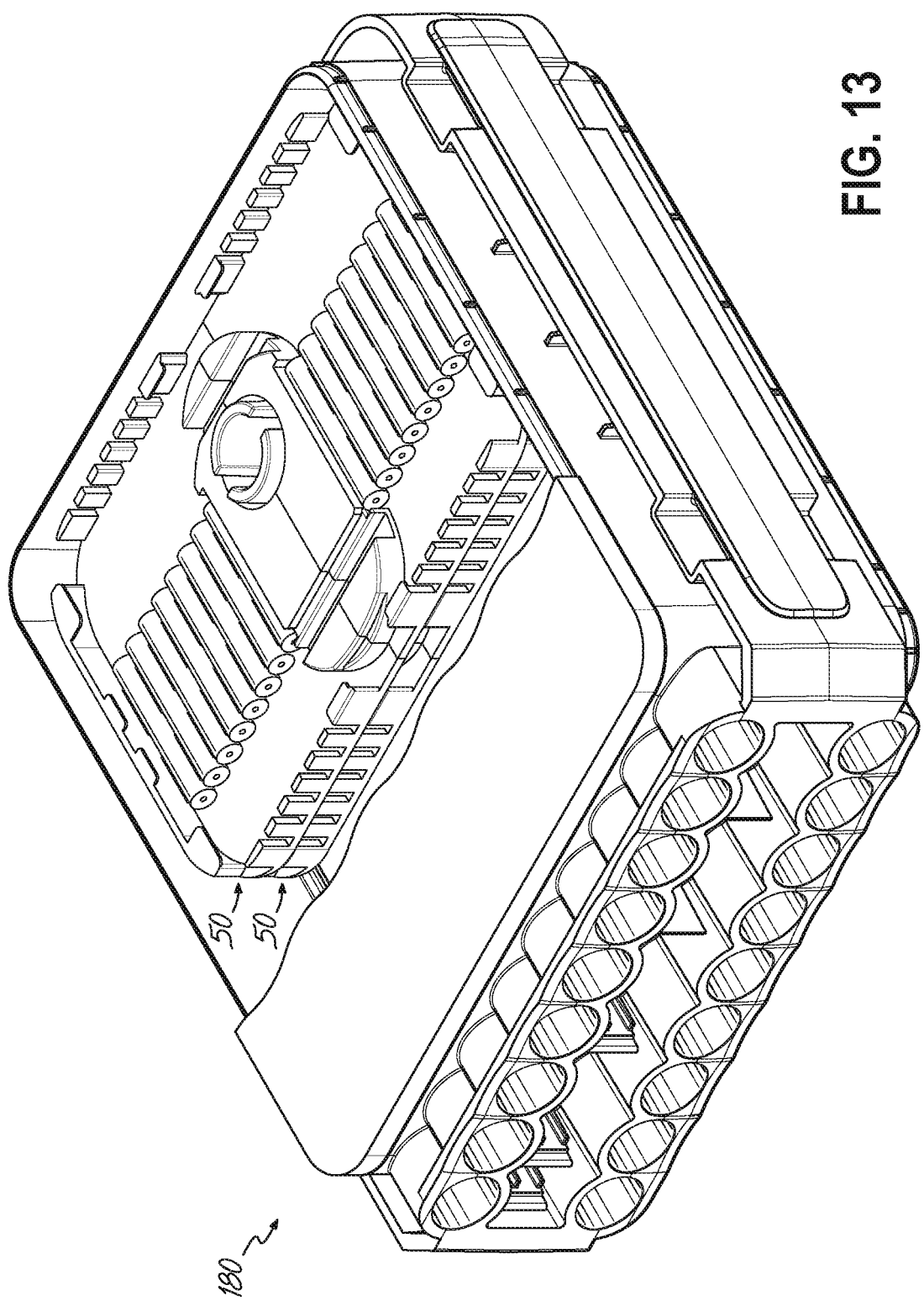
FIG. 13 illustrates an example of a terminal for a fiber optic network having a plurality of WDM cassettes in accordance with an embodiment of the disclosure.

FIG. 13 illustrates one example of a terminal 180 for a fiber optic network (e.g., the network 10 in FIG. 1) having a plurality of WDM cassettes 50 disposed therein for performing the multiplexing/ demultiplexing functionality of the fiber optic network. Each of the cassettes 50 may be assembled in accordance with aspects of the disclosure and include excess fiber length (not shown in FIG. 13 for clarity) that is highly organized within the cassettes 50.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A wavelength division multiplexing (WDM) cassette, comprising:
    a cassette body including a first cassette workpiece and a second cassette workpiece;
    a first plurality of wavelength filters attached to the first cassette workpiece, each of the first plurality of the wavelength filters having a first end facing a first side of the cassette body and a second end facing a second side of the cassette body;
    a second plurality of wavelength filters attached to the second cassette workpiece, each of the second plurality of the wavelength filters having a first end facing a first side of the cassette body and a second end facing a second side of the cassette body;
    a plurality of first optical fibers each extending from the second end of a respective wavelength filter in the first plurality of wavelength filters;
    a plurality of second optical fibers each extending from the second end of a respective wavelength filter in the second plurality of wavelength filters; and
    a mass fusion splice connecting ends of the plurality of first optical fibers and ends of the plurality of second optical fibers such that a main fiber loop is formed between the first plurality of wavelength filters and the second plurality of wavelength filters;
    wherein the main fiber loop is stored within the cassette body in a twisted and folded configuration that defines a plurality of cassette loops, wherein each of the plurality of cassette loops is sized to fit within the confines of the cassette body, and
    wherein the first cassette workpiece is defined by a first cassette body portion and the second cassette workpiece is defined by a second cassette body portion, and wherein the first cassette body portion and the second cassette body portion are connected together to form the cassette bod.

2. The WDM cassette of claim 1, wherein the first plurality of wavelength filters is arranged side-by-side on the first cassette workpiece.

3. The WDM cassette of claim 2, wherein the first cassette workpiece includes a plurality of dividing walls or ridges that define a plurality of generally parallel slots, wherein each slot is configured to receive a respective one of the first plurality of wavelength filters.

4. The WDM cassette of claim 3, wherein the second plurality of wavelength filters is arranged side-by-side on the second cassette workpiece, wherein the second cassette workpiece includes a plurality of dividing walls or ridges that define a plurality of generally parallel slots, wherein each slot is configured to receive a respective one of the second plurality of wavelength filters.

5. The WDM cassette of claim 1, wherein the cassette body further includes a plurality of tabs for securing the plurality of cassette loops to the cassette body.

6. The WDM cassette of claim 1, wherein the mass fusion splice includes a splice protector, and wherein the cassette body includes a channel that receives the splice protector.

7. The WDM cassette of claim 1, wherein a length D of the loop correlates to a physical dimension of the cassette body.

8. The WDM cassette of claim 7, wherein the length D of the loop correlates to an inner perimeter of the cassette body.

9. A wavelength division multiplexing (WDM) cassette, comprising:
    a cassette body including a first cassette workpiece and a second cassette workpiece; a first plurality of wavelength filters attached to the first cassette workpiece, each of the first plurality of the wavelength filters having a first end facing a first side of the cassette body and a second end facing a second side of the cassette body;
    a second plurality of wavelength filters attached to the second cassette workpiece. each of the second plurality of the wavelength filters having a first end facing a first side of the cassette body and a second end facing a second side of the cassette body;
    a plurality of first optical fibers each extending from the second end of a respective wavelength filter in the first plurality of wavelength filters;
    a plurality of second optical fibers each extending from the second end of a respective wavelength filter in the second plurality of wavelength filters; and
    a mass fusion splice connecting ends of the plurality of first optical fibers and ends of the plurality of second optical fibers such that a main fiber loop is formed between the first plurality of wavelength filters and the second plurality of wavelength filters;
    wherein the main fiber loop is stored within the cassette body in a twisted and folded configuration that defines a plurality of cassette loops, wherein each of the plurality of cassette loops is sized to fit within the confines of the cassette body, and
    wherein the first cassette workpiece is defined by a first mounting plate and the second cassette workpiece is defined by a second mounting plate, and wherein the first mounting plate and the second mounting plate are connected to the cassette body.

10. The WDM cassette of claim 9, wherein the first plurality of wavelength filters is arranged side-by-side on the first cassette workpiece.

\* \* \* \* \*